Aug. 25, 1959 E. B. LEAR ET AL 2,901,260
WHEEL LOCK
Filed June 19, 1956 3 Sheets-Sheet 3
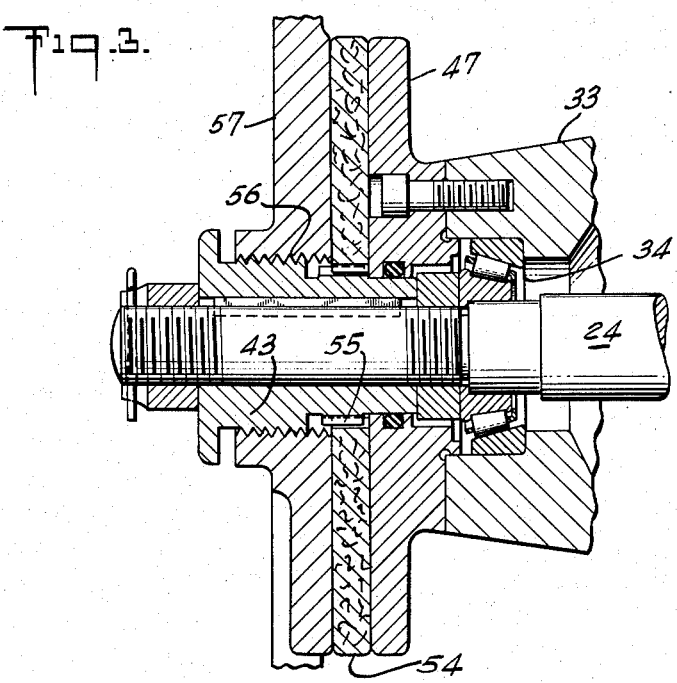
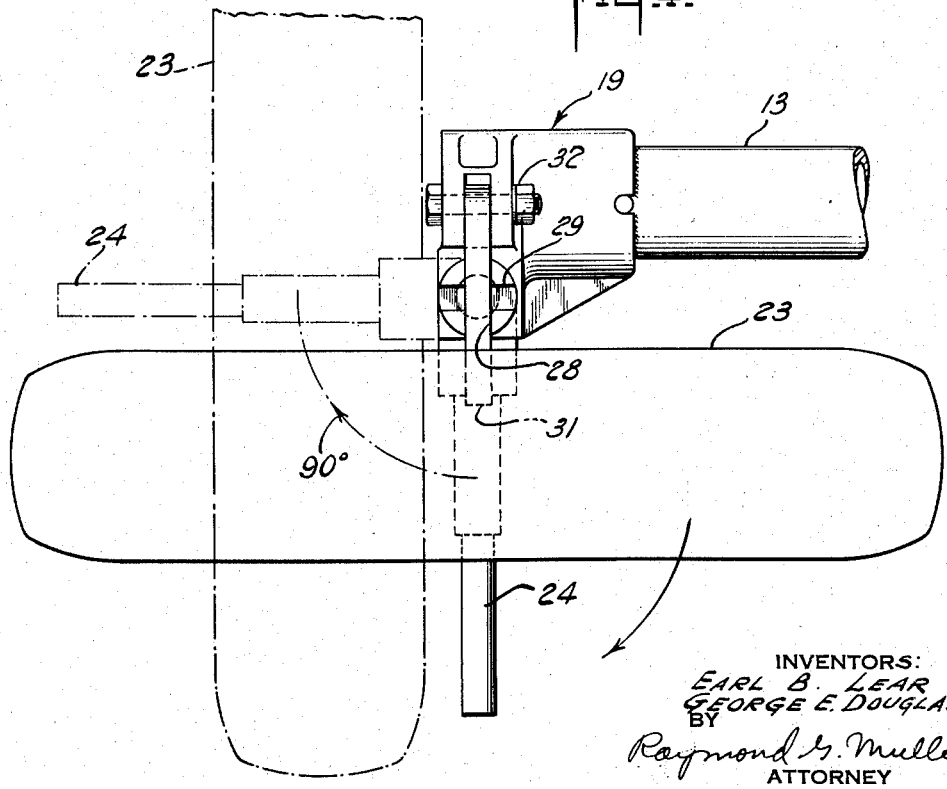
INVENTORS:
EARL B. LEAR
GEORGE E. DOUGLAS.
BY
Raymond G. Mullee
ATTORNEY

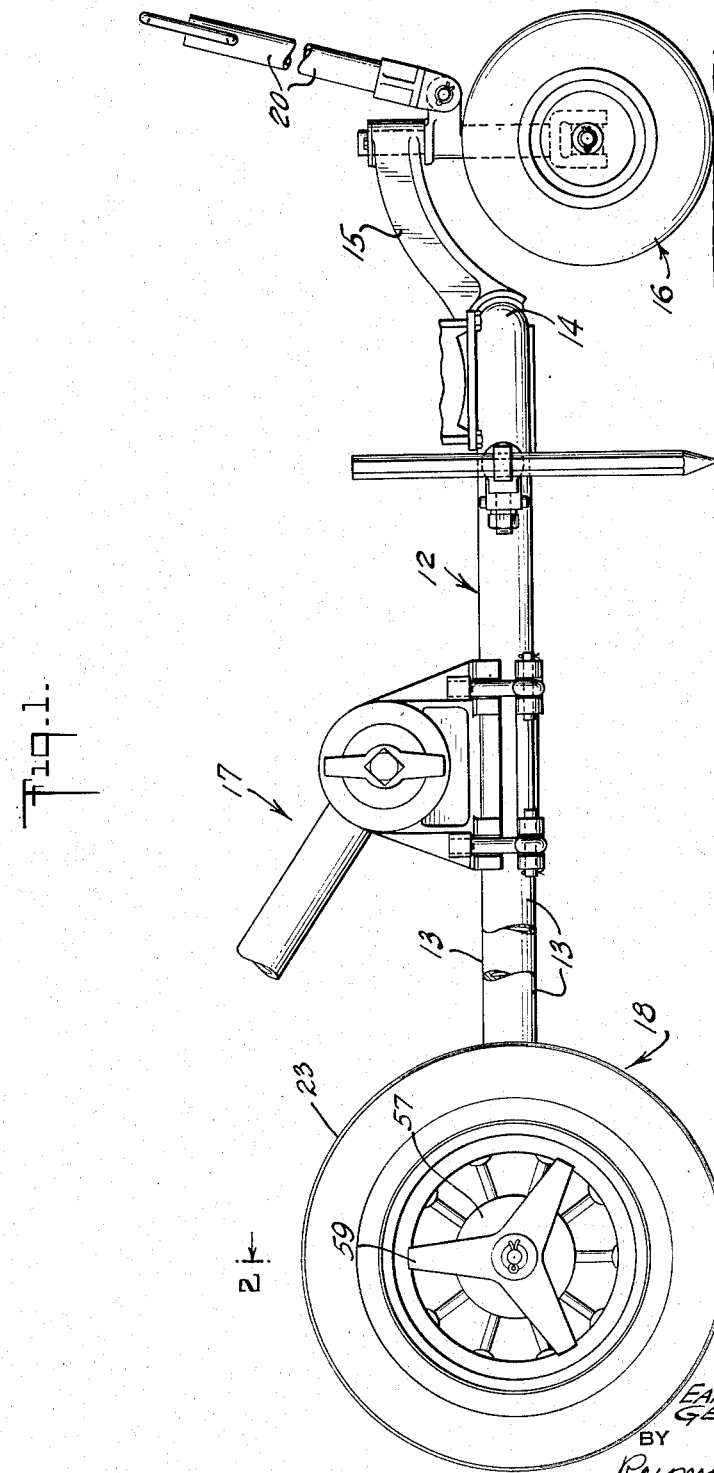

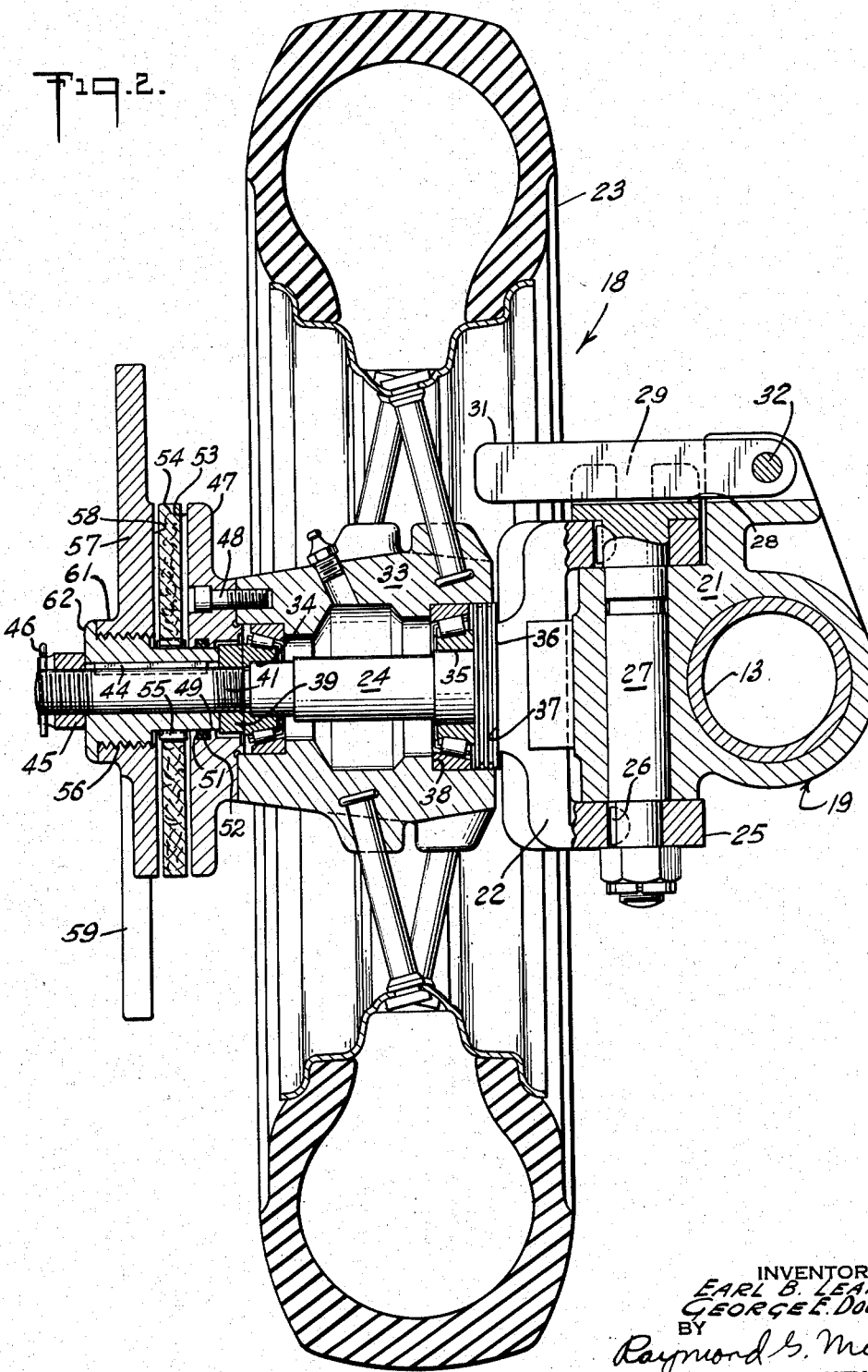

2,901,260

WHEEL LOCK

Earl B. Lear, Utica, N.Y., and George E. Douglas, Franklin, Pa., assignors to Chicago Pneumatic Tool Company, New York, N.Y., a corporation of New Jersey Application June 19, 1956, Serial No. 594,074

3 Claims. (Cl. 280—29)

This invention pertains to a wheel locking device, and particularly to a locking device which restrains the wheel from rotating.

While the invention is subject to wide application, it finds particular use in association with a supporting wheel of a rock drill wagon so as to effectively lock the wheel against rotation. The drill wagon, with which the invention is shown herein by way of illustration, comprises a chassis or frame on which heavy machinery, such as a rock drill, is adapted to be mounted and carried. The wagon includes a tow bar at its forward end whereby it may be towed about by another vehicle. When the wagon is parked, or when the drill equipment mounted thereon is in operation, it is desired that the wagon will not roll.

It is, therefore, an object of this invention to effectively lock the wheels of a rock drill wagon against rotation so as to hold the latter stationary.

It is a further object of this invention to effectively lock a rotatable wheel against rotation by practical and efficient manually operable means.

It is a still further object of this invention to provide an efficient wheel locking arrangement which is associated with the hub of a rotatable wheel and is carried on the spindle shaft of the latter.

It is a further object of this invention to provide a rear wheel assembly for a drill wagon which is pivotable from a position parallel to the side of the wagon to a position 90° removed at the rear thereof.

The invention further lies in the construction of its component parts as well as in their general arrangement and cooperative association with one another to effect the purposes intended.

The foregoing and other objects and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description, and are not to be construed as defining the limits of the invention.

In the drawings:

Fig. 1 is a side elevational view of a rock drill wagon embodying the invention;

Fig. 2 is a vertical section through one of the rear wheels showing the wheel in unlocked condition;

Fig. 3 is a fragmentary detail showing the wheel in locked condition; and

Fig. 4 is a top plan view showing the wheel in a position moved 90° to the rear and in normal position.

Reference is now directed to the drawings wherein there is shown in Fig. 1 a rock drill wagon or rig having a yoke type chassis 12 formed by a parallel pair of horizontally disposed spaced arms 13. Arms 13 are bridged at their forward ends 14. Extending from this bridged end is a neck 15 which swivelly supports a front or pilot wheel assembly 16. The latter is equipped with a tow bar 20 for attaching the wagon to a tow vehicle.

The chassis 12 is intended as a mount for conventional rock drill machinery or the like, and it is equipped with suitable supporting brackets and framing 17 for this purpose.

The free end of each chassis arm 13 is supported by a separate rear wheel assembly 18, of which but one is shown (Fig. 2).

A rear wheel assembly includes a mounting bracket 19 having a body portion 21 which caps the rear end of an arm 13 and is fixed to the latter as by welding. This body portion 21 extends laterally and at right angles from the outside of arm 13. It serves to support the yoke end 22 of a spindle or stub shaft 24 which carries a rear wheel 23. The arms 25 of the spindle yoke are keyed fast, as at 26, to a king pin 27 which swivels in the body portion 21.

The king pin is provided with a pair of cross slots 28, 29 in its head, intersecting one another at right angles. In the normal position of the king pin as in Figs. 2 and 4, slot 29 runs parallel to the chassis arm 13, while the other slot 28 runs at right angles thereto. A lever 31 pivoted at 32 in an upright of the bracket mount is manually pivotable crosswise of arm 13 to engage in either slot, accordingly, as the king pin is swivelled by the spindle yoke and one or the other of the slots is brought into registry with the lever. When the lever engages in slot 28, it will latch the king pin and the associated spindle shaft in a position wherein the rear wheel 23 is located parallel to arm 13, as indicated in Figs. 1, 2, and by the full line in Fig. 4. When the lever latches in slot 29, it will latch the king pin and the associated spindle in a position wherein the wheel is 90° removed and located to the rear of arm 13 and at right angles thereto, as indicated by broken line in Fig. 4. This swivel and latch feature permits movement of the drill wagon along the face of the work in horizontal drilling operations, thus eliminating pulling out, maneuvering, and backing each time a new location is desired.

Wheel 23 has a hub 33 unitary therewith which is mounted for rotation on the outer races of bearings 34, 35. The inner races of these are fitted tight upon the spindle shaft. The hub 33 is restrained against longitudinal inward movement on the spindle shaft by a collar 36 carried by the latter. Collar 36 limits at one end against a shoulder 37 of the spindle shaft, and limits at its opposite end against the adjacent end wall of the inner race of bearing 35. The wheel hub is further restrained against inward movement along the spindle shaft by an internal shoulder 38 limiting against the adjacent end wall of the outer race of bearing 35. The wheel hub is restrained against outward movement on the spindle by means of a check nut 39 which is threaded upon a short threaded section 41 of the spindle up against the outer end wall of the inner race of the outer bearing 34; and it is further restrained against outward movement by an internal shoulder 42 of the wheel hub limiting against the opposed end wall of the outer race of bearing 34.

A spindle nut 43 is held fast on the outer portion of the spindle shaft by a key 44. This spindle nut has an elongated body, the inner end wall of which limits against check nut 39. A retaining nut 45, threaded onto the outer end of the spindle shaft and prevented from escape by a cotter pin 46, limits against the outer end of spindle nut 43 so as to fix the position of the latter.

A hub cap or end wall member 47 is mounted fast to a thick outer end of the wheel hub by a plurality of bolts 48. The hub member 47 revolves as a unit with the wheel hub 33. It has an axial internal wall 49 which bears upon a complementary smooth peripheral bearing surface portion 51 of the spindle nut. Entrance of dirt between the surfaces 49, 51 to the outer bearing 34 is blocked by a sealing ring 52.

The hub member 47 provides a radially extending outer circular wall or face 53. This end face is adapted to be frictionally engaged by a friction disc 54 of similar diameter. Disc 54 has internal straight splines engaging complementary straight splines at 55 on the spindle nut, whereby the friction disc is longitudinally slidable into and out of frictional engagement with the hub member.

The outer end portion 56 of the spindle nut, just beyond the straight splined portion thereof, is threaded or helically splined. This helically splined portion is of greater diameter than the overall diameter of the adjacent straight splined portion 55. Threadedly engaged on this helically splined or screw section 56 is a brake lock or locking nut member 57. The latter has an inner radial face 58 equal in diameter to that of the friction disc. It has several radially extended spokes 59 set back from its inner face 58. The brake lock has a normal unlocked position (Fig. 2) on the spindle nut wherein its inner face is free of the friction disc. A short projecting outer end hub 61 of the brake lock normally limits against a radial end flange 62 of the spindle nut. The friction disc is freely disposed in the space normally existing between the brake lock 57 and the wheel hub member 47.

The brake lock is adapted to be spun by means of its spokes in a clockwise direction (Fig. 1), whereby it is caused to travel on its helical threads inwardly and to extend freely over the adjacent straight splined section of the spindle nut so as to butt the friction disc and slide it into frictional engagement with the outer face of the wheel hub member 47 (Fig. 3). The helically splined section 56 of the brake lock is elongated sufficiently to enable the latter to travel along the spindle nut a sufficient distance to pass partially over the adjacent straight splined section without leaving the inner end of the helically splined section of the spindle nut. This occurs when the brake lock engages the friction disc with the wheel hub.

When the brake lock frictionally engages the friction disc with the wheel hub, the associated wheel 23 is restrained or braked against rotation (Fig. 3). It is to be noted that both faces of friction disc 54 have friction surfaces. Accordingly, the brake lock member is likewise restrained against release in a counterclockwise direction as a result of this braking action. Pressure exerted on the brake lock in engaging the friction disc with the wheel hub also causes a reaction through the threads of the brake lock member and those of the spindle nut whereby the brake lock is further restrained against counterclockwise release movement. The brake lock may be released by an overpowering force exerted in a counterclockwise direction (Fig. 1). The operator can effect this by applying a sharp blow with a convenient tool against one of the spoke members. Release of the brake lock from the friction disc releases the latter from braking engagement with the hub cap of the wheel.

Now, when the brake lock member has been returned to normal released position, the end hub 61 of the brake lock limits against the end flange 62 of the spindle nut. If a little added pressure is exerted upon the brake lock in a counterclockwise direction, it will cause the elements 61, 62 to frictionally bind. This prevents creeping of the brake lock member along the spindle nut into engagement with the friction disc during travel of the drill wagon. Release of the brake lock from this condition can be effected by a sharp blow applied in the proper direction by a convenient tool against one of the spokes.

While an embodiment of the invention has been illustrated and described in detail, it is to be expressly understood that the invention is not limited thereto. Various changes may be made in the design and arrangement of its parts without departing from the spirit and scope of the invention as the same will now be understood by those skilled in the art; and it is our intention, therefore, to claim the invention not only as shown and described above, but also in all such forms and modifications thereof as may reasonably be construed to fall within the spirit of the invention and the scope of the appended claims.

What is claimed is:

1. In a drill wagon of the character described including a supporting chassis, a bracket fixed to a side of the chassis in close proximity to the rear end of the latter and having a block portion extending at right angles away from the said side of the chassis, a common spindle, pivot means connecting the spindle at one end to the block for pivotable movement of the spindle in a horizontal plane from a position at the side of the chassis to a position at the rear thereof, a wheel supporting the chassis upon the ground having a hub that is rotatably mounted on the spindle and includes a radially enlarged outer end face, and means carried upon the spindle for locking the wheel against rotation regardless of the pivoted position of the spindle, the said locking means comprising an extension of the spindle beyond the outer end face of the hub of the wheel, a friction disc axially slidable on the extension into and out of frictional engagement with the said end face of the hub of the wheel, and pressure disc plate means located on the spindle outwardly of the friction disc being threadable along the spindle for carrying the friction disc into locking frictional engagement with the end face of the hub of the wheel, wherein the pressure disc plate means is characterized by a radial arm adapted to be manually gripped for direct application of manual operating force to thread the disc plate means along the spindle.

2. In a drill wagon of the character described including a supporting chassis, a bracket fixed to a side of the chassis in close proximity to the rear end of the latter and having a block portion extending at right angles away from the said side of the chassis, a common spindle, pivot means connecting the spindle at one end to the block for pivotable movement of the spindle in a horizontal plane from a position at the side of the chassis to a position at the rear thereof, a wheel supporting the chassis upon the ground having a hub that is rotatably mounted on the spindle and includes a radially enlarged end face, and means carried upon the spindle for locking the wheel against rotation regardless of the pivoted position of the spindle, the said locking means comprising an extension of the spindle beyond the end face of the hub of the wheel, a friction disc axially slidable on the extension into and out of frictional engagement with the end face of the hub of the wheel, and pressure disc plate means manually threadable along the spindle for carrying the friction disc into locking frictional engagement with the end face of the hub of the wheel, wherein an elongated keeper knife is pivoted at one end to the bracket for angular movement in a vertical plane over the block at right angles to the said side of the chassis and the pivot means is a pivot pin fixed to the spindle and characterized by an enlarged head disposed above the block and having a pair of keeper slots intersecting one another at right angles, one of the slots being registrable for reception of the free end of the keeper knife when the spindle has a pivoted position at right angles to the said side of the chassis, and the other slot being registrable for reception of the free end of the keeper knife when the spindle has a pivoted position 90 degrees removed rearwardly from the last mentioned position.

3. In a drill wagon as in claim 2, wherein the pivoted end of the spindle is characterized by a yoke having a pair of parallel arms spaced in a vertical plane, one of the arms being in contact with the top of the block and the other arm being in contact with the bottom of the block, and wherein the pivot pin is fixed at opposite end portions to the arms whereby the pivot pin is turnable as a unit with the yoke relative to the block.

References Cited in the file of this patent

UNITED STATES PATENTS

| | | |
|---|---|---|
| 1,653,013 | Kachel | Dec. 20, 1927 |
| 2,045,593 | Frankland | June 30, 1936 |
| 2,097,942 | Whitney | Nov. 2, 1937 |
| 2,581,533 | Hipple | Jan. 8, 1952 |
| 2,596,318 | Willi et al. | May 13, 1952 |
| 2,797,927 | Raff | July 2, 1957 |

FOREIGN PATENTS

| | | |
|---|---|---|
| 705,636 | France | June 10, 1931 |
| 252,569 | Italy | Mar. 25, 1927 |